(12) United States Patent
Shen et al.

(10) Patent No.: US 8,732,778 B1
(45) Date of Patent: May 20, 2014

(54) ON-DEMAND MOBILE WIRELESS BROADCAST VIDEO DELIVERY MECHANISM

(75) Inventors: Jun Shen, Redmond, WA (US); Yung Shirley Choi-Grogan, Issaquah, WA (US); Ming Zhang, Bellevue, WA (US)

(73) Assignee: AT&T Mobility II LLC, Altanta, GA (US)

( * ) Notice: Subject to any disclaimer, the term of this patent is extended or adjusted under 35 U.S.C. 154(b) by 818 days.

(21) Appl. No.: 11/936,452

(22) Filed: Nov. 7, 2007

(51) Int. Cl.
*H04N 7/173* (2011.01)
(52) U.S. Cl.
USPC ............................................. 725/98; 725/118
(58) Field of Classification Search
None
See application file for complete search history.

(56) References Cited

U.S. PATENT DOCUMENTS

| | | | |
|---|---|---|---|
| 6,710,702 B1* | 3/2004 | Averbuch et al. | 340/7.1 |
| 6,865,169 B1* | 3/2005 | Quayle et al. | 370/335 |
| 7,035,636 B1* | 4/2006 | Lim et al. | 455/433 |
| 7,522,598 B2* | 4/2009 | Wong et al. | 370/390 |
| 7,574,724 B2* | 8/2009 | Tannenbaum | 725/86 |
| 2002/0108117 A1* | 8/2002 | Sedlak et al. | 725/87 |
| 2003/0194992 A1* | 10/2003 | Kim et al. | 455/414.1 |
| 2005/0220322 A1* | 10/2005 | Olesen et al. | 382/100 |
| 2006/0025157 A1* | 2/2006 | Kuwahara et al. | 455/456.1 |
| 2006/0029078 A1* | 2/2006 | Lu et al. | 370/395.2 |
| 2006/0083253 A1* | 4/2006 | Park et al. | 370/401 |
| 2006/0167979 A1* | 7/2006 | Fuchs et al. | 709/203 |
| 2007/0070949 A1* | 3/2007 | Hwang et al. | 370/331 |
| 2007/0197222 A1* | 8/2007 | Rune | 455/436 |
| 2007/0287473 A1* | 12/2007 | Dupray | 455/456.1 |
| 2008/0155112 A1* | 6/2008 | Ma et al. | 709/231 |
| 2008/0242280 A1* | 10/2008 | Shapiro et al. | 455/414.3 |
| 2009/0006625 A1* | 1/2009 | Gutknecht et al. | 709/226 |
| 2009/0007189 A1* | 1/2009 | Gutknecht et al. | 725/64 |
| 2009/0119728 A1* | 5/2009 | Broberg | 725/114 |
| 2012/0072966 A1* | 3/2012 | Chen et al. | 725/134 |

\* cited by examiner

*Primary Examiner* — Ricky Chin
(74) *Attorney, Agent, or Firm* — Guntin & Gust, PLC; Andrew Gust

(57) ABSTRACT

A mobile broadcast service center and a mobile wireless network to deliver broadcast video to mobile wireless devices. When the mobile broadcast service center receives a request to deliver a broadcast video channel to a target mobile wireless device, it designates as target an intermediate node in the network that serves the target mobile wireless device. The mobile broadcast service center first determines if an existing channel bundle is routed to the target intermediate node. If this first determination is negative, the mobile broadcast service center routes a new channel bundle to the target intermediate node, including the requested broadcast video channel. If the first determination is positive, the mobile broadcast service center then determines if the requested broadcast video channel is in the existing channel bundle. If this second determination is negative, then it adds the requested broadcast video channel to the existing channel bundle.

18 Claims, 5 Drawing Sheets

ON-DEMAND MOBILE WIRELESS BROADCAST VIDEO DELIVERY MECHANISM

BACKGROUND OF THE INVENTION

1. Field of the Invention

The present invention is directed generally to mobile wireless network services. In particular, the invention is directed to a delivery mechanism for delivering broadcast video channels to mobile wireless devices.

2. Description of the Related Art

Operators of mobile wireless networks want to offer their users a variety of broadcast video channels. A broadcast video channel is a broadcast video channel that can be viewed by many different users at the same time. Each user will see the same part of the video at the same time as other users. In contrast, a streamed broadcast video channel is a broadcast video channel that is sent only to a user that requests it. The same streaming video may be requested by different users, but each user will receive their own stream. Each streaming video user will see a different part of the video than the other users viewing at the same time.

Currently, to deliver broadcast video channels to mobile wireless devices, a network operator uses a server called a mobile broadcast service center to route a set of all the broadcast video channels the network operator offers through a wireless mobile communication network to each radio network controller in the network.

Routing a set of all offered broadcast video channels to each radio network controller has the advantage that little or no modifications need to be made to the mobile wireless network. However, routing a set of all offered broadcast video channels to each radio network controller is not an efficient use of transmission links in the network. This practice is inefficient since channels routed to a radio network controller are not forwarded unless requested for mobile wireless devices served by that radio network controller, and many are usually not requested at any one time. This inefficiency becomes worse as the network operator offers more channels since the ratio between the number of channels requested and the number offered usually becomes smaller. Compounding the inefficiency is the fact that requests for broadcast video channels are not evenly distributed geographically. Mobile video users are concentrated in some areas such as urban centers and most of the time their usage is limited to several popular broadcast video channels. In some areas, some channels may never be requested.

The cost of transport for broadcast video channels across the network transmission links is significant and this cost is highest on the transmission links nearer the network edge (i.e., the base stations). What is needed is a way to route broadcast video channels responsive to requests in order to minimize use of the network transmission links, particularly those nearer the network edge, while minimizing the amount of changes to the mobile wireless network.

BRIEF DESCRIPTION OF THE SEVERAL VIEWS OF THE DRAWING(S)

DETAILED DESCRIPTION OF THE INVENTION

Several embodiments of the invention are show in the attached figures and discussed below. Multiple elements that are substantially similar to each other appear with a common reference number, but are distinguished by a differing reference letter suffix (e.g. 1000a, 1000b, etc.). Groups of substantially similar elements are referred to collectively by their common reference number without a suffix.

Figure 1:
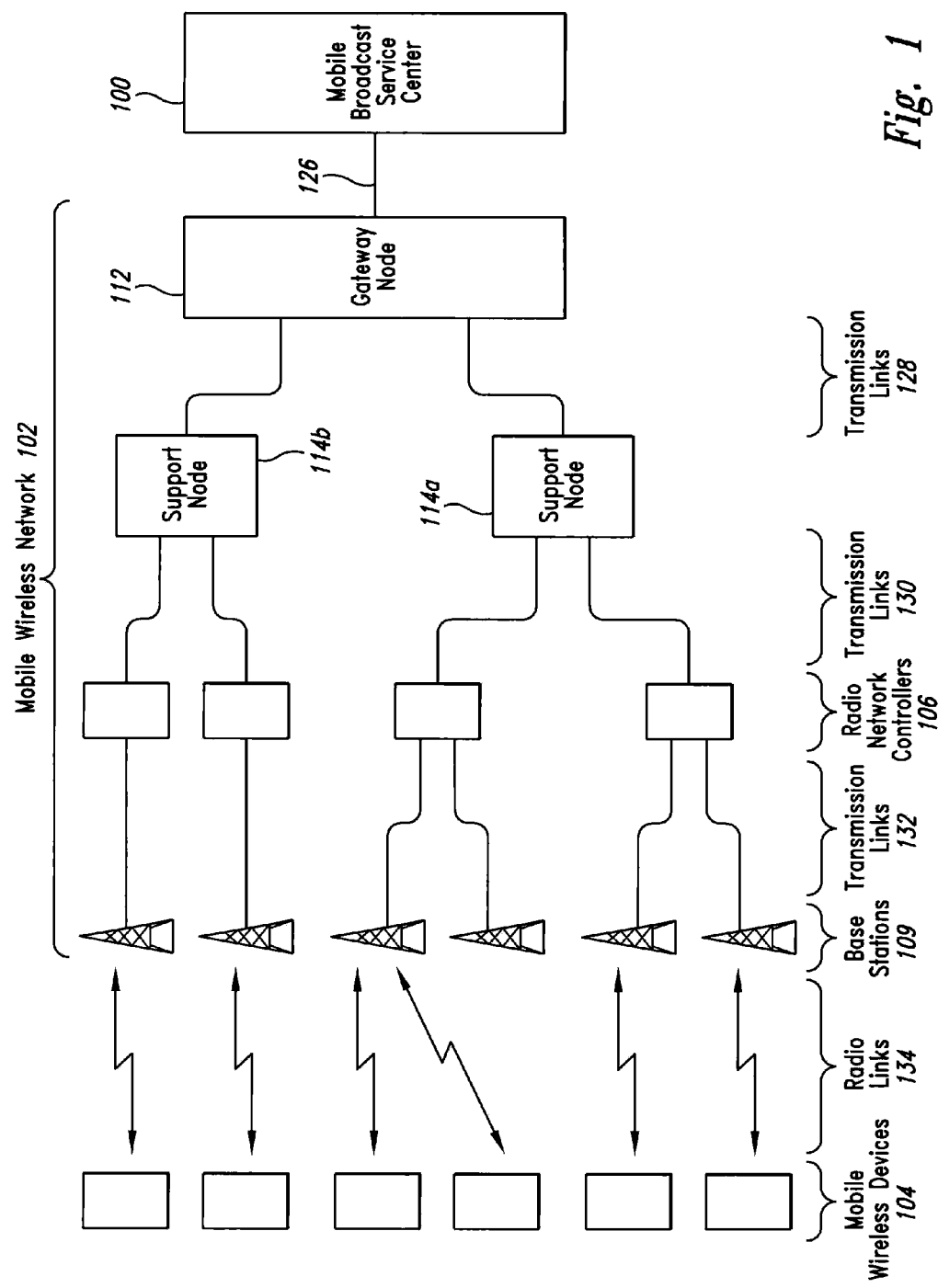
FIG. 1 shows a mobile broadcast service center connected to a mobile wireless network.

FIG. 1 shows a mobile broadcast service center 100 connected to a mobile wireless network 102. The mobile broadcast service center 100 is configured to provide broadcast video channels to users of mobile wireless devices 104 through the mobile wireless network 102.

The mobile wireless network 102 is comprised of various network elements including base stations 109, radio network controllers 106, support nodes 114, at least one gateway node 112, and includes various transmission links 128, 130, 132 between the network elements. The gateway node 112 has one or more interfaces that provide the mobile wireless network 102 the ability to connect to other networks and devices not part of the mobile wireless network 102. The gateway node 112 is connected to one or more support nodes 114 via transmission links 128. The support nodes 114 route traffic within the mobile wireless network 102. Each support node 114 is connected to one or more radio network controllers 106 via transmission links 130. Each radio network controller 106 is connected to and controls one or more base stations 109 via transmission links 132. The base stations 109 serve mobile wireless devices 104 associated with the mobile wireless network 102 via radio links 134. Thus, the mobile broadcast service center 100 and the mobile wireless devices 104 may be considered terminal nodes in a video delivery network while portions of the mobile wireless network, such as the radio network controllers 106, have stations 109, gateway node 112 and support nodes 114 may be considered intermediate nodes through which data is routed.

Each mobile wireless devices 104 may be served by one of the base stations 109, usually the base station 109 that the particular mobile wireless device 104 has the best quality radio link 134 with. When one of the mobile wireless devices 104 moves, the quality of the radio link 134 to the serving base station 109 may change. Conventional handoff procedures are used to switch service for the moving mobile wireless device 104 to a different base station 109.

In one embodiment, the mobile wireless network 102 conforms to the Universal Mobile Telecommunications Service (UMTS) standard. In such an embodiment, one of the base stations 109 corresponds to a UMTS Node B, the radio network controllers 106 correspond to UMTS Radio Network Controllers (RNCs), the support nodes 114 correspond to UMTS Serving GPRS Support Nodes (SGSNs) (where GPRS is General Packet Radio Service), the gateway node 112 corresponds to a UMTS GPRS Gateway Support Node (GGSN), and the various transmission links 128, 130, 132 comply with the appropriate UMTS interface standards.

Figure 2:
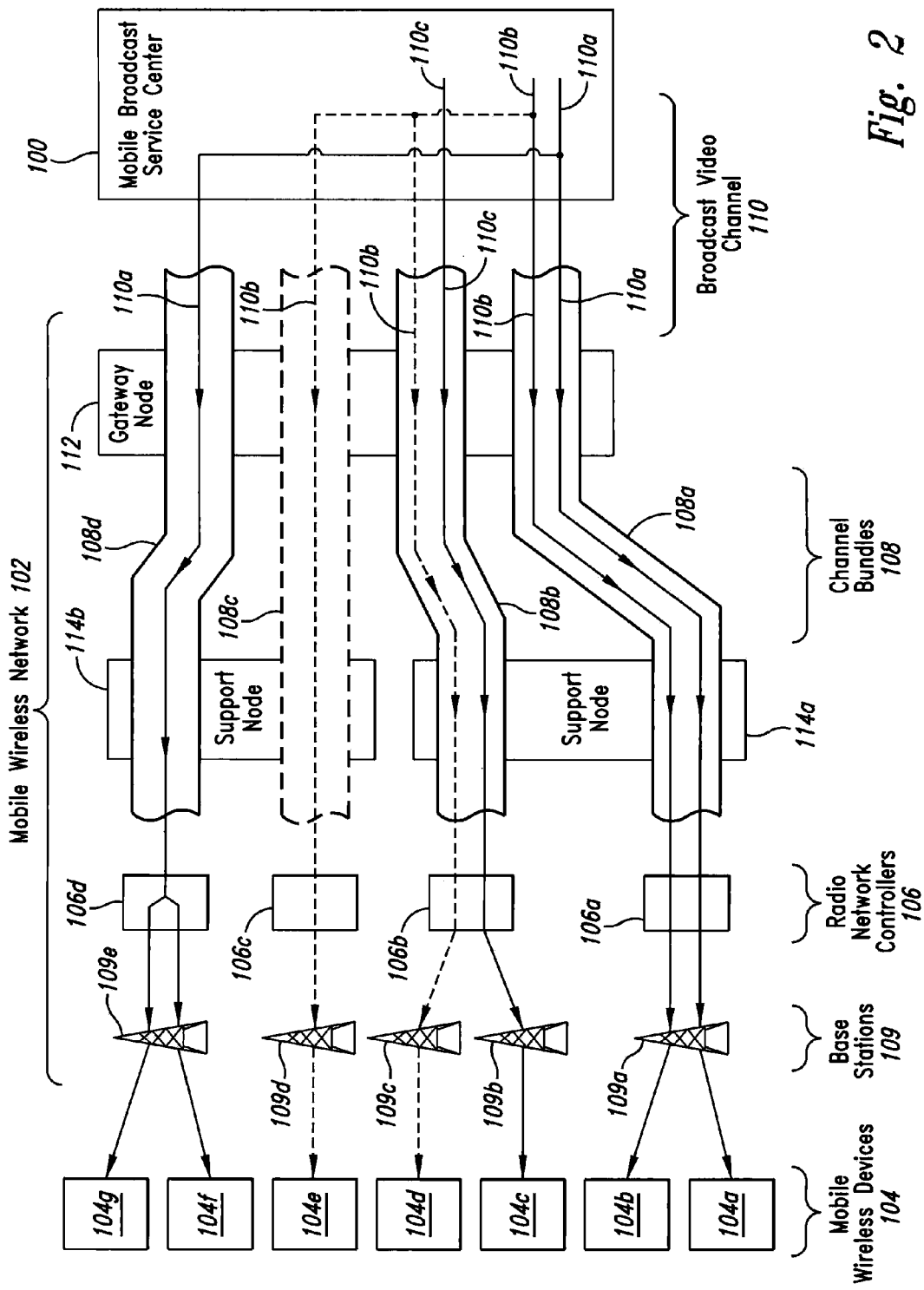
FIG. 2 shows an overall view of the mobile wireless network and the mobile broadcast service center together providing broadcast video to mobile wireless devices.

FIG. 2 shows an overall view of the mobile wireless network 102 and the mobile broadcast service center 100 together providing broadcast video to mobile wireless devices 104. The mobile broadcast service center 100 is configured to generate broadcast video channels 110. The mobile broadcast service center 100 is configured to pack the broadcast video channels 110 into channel bundles 108. The mobile broadcast service center may pack one of the broadcast video channels 110 into more than one of the channel bundles 108. For example, broadcast video channel 110a is packed into channel bundles 108a and 108d. The radio network controllers 106 are each configured to terminate a channel bundle 108 and forward each included broadcast video channel 110 to base stations 109 that have a demand for that broadcast video channel 110. Each base station 109 is configured to broadcast the broadcast video channels 110 forwarded to it. Several examples of how channel bundles 108 are created, packed and routed are given below.

In a first example, FIG. 2 shows a channel bundle 108a containing two broadcast video channels 110a, 110b. The mobile broadcast service center 100 generates broadcast video channel 110a responsive to a request to deliver the broadcast video channel 110a to a mobile device 104a. The mobile broadcast service center 100 generates broadcast video channel 110b responsive to a request to deliver the broadcast video channel 110b to a mobile device 104b. The mobile broadcast service center 100 creates channel bundle 108a and packs it with the broadcast video channels 110a and 110b. The mobile broadcast service center 100 routes the channel bundle 108a via the gateway node 112 to the radio network controller 106a serving mobile wireless devices 104a and 104b. The gateway node 112 forwards the channel bundle 108a to the intervening support node 114a. Support node 114a forwards the channel bundle 108a to radio network controller 106a. Radio network controller 106a terminates channel bundle 108a and forwards the formerly bundled broadcast video channels 110a and 110b to the base station 109a. The base station 109a broadcasts the channels 110a and 110b, which the mobile devices 104a and 104b respectively receive.

In a second example, FIG. 2 shows a channel bundle 108b containing broadcast video channel 110c. The mobile broadcast service center 100 generates broadcast video channel 110c responsive to a request to deliver the broadcast video channel 110c to a mobile device 104c. The mobile broadcast service center 100 creates channel bundle 108b that initially is packed only the requested broadcast video channel 110c. The mobile broadcast service center 100 routes channel bundle 108b via the gateway node 112 to the radio network controller 106b serving mobile wireless device 104c. The gateway node 112 forwards the channel bundle 108b to the intervening support node 114a. The support node 114a forwards the channel bundle 108b to the target radio network controller 106b. The target radio network controller 106b terminates the channel bundle 108b. The target radio network controller 106b then decides where to route the unbundled broadcast video channel 110c. The target radio network controller 106b controls base stations 109b and 109c. The target mobile device 104c is served by base station 109b. The other base station 109c serves another mobile device 104d, which has not yet requested a broadcast video channel 110. The target radio network controller 106b forwards the broadcast video channel 110c to the base station 109b, but not to the base station 109c. The base station 109b then broadcasts the channel 110c, which may be received by the target mobile wireless device 104c.

In third example, FIG. 2 shows a channel bundle 108d containing broadcast video channel 110a. The mobile broadcast service center 100 has received a request to deliver the broadcast video channel 110a to a mobile device 104f.

Mobile device 104f is served by radio network controller 106d. Broadcast video channel 110a was already requested by the first mobile wireless device 104a and included in channel bundle 108a. However, the channel bundle 108a also contains the broadcast video channel 110b, which has not been requested by any mobile wireless device 104 served by the radio controller 106d. It would be inefficient to send a copy of the channel bundle 108a with an unrequested broadcast video channel 110b to the radio controller 106d. Instead, the mobile broadcast service center 100 creates a channel bundle 108d packed only with the broadcast video channel 110a. The mobile broadcast service center 100 routes the channel bundle 108d to the radio network controller 106d via the gateway node 112. The gateway node 112 forwards the channel bundle 108d to the intervening support node 114b. The intervening support node 114b forwards the channel bundle 108d to the radio network controller 106d. The radio network controller 106d terminates the channel bundle 108d and forwards the unbundled broadcast video channel 110a to the base station 109e. The base station 109e then broadcasts the channel 110a, which may be received by the mobile wireless device 104f.

In a fourth example, FIG. 2 shows a radio network controller 106c that serves a single mobile wireless device 104e through base station 109d. No broadcast video channel 110 has currently been requested to be delivered to mobile wireless device 104e. Thus no channel bundle 108 is currently routed to radio network controller 106c.

Figure 3:
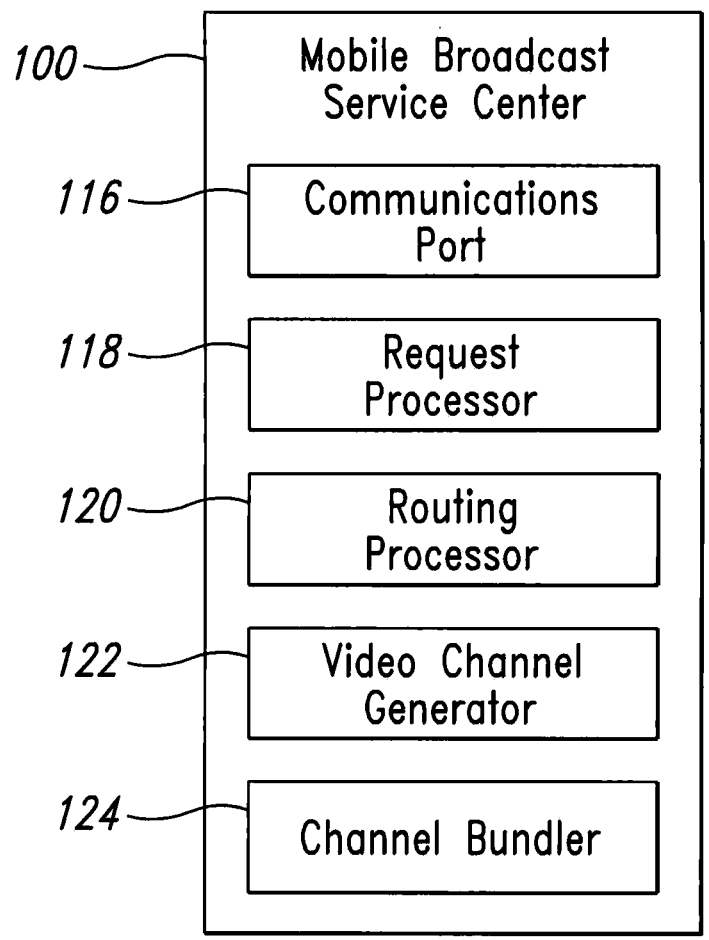
FIG. 3 shows a detailed view of the mobile broadcast service center and its constituent components.

FIG. 3 shows a detailed view of the mobile broadcast service center 100 and its constituent components. The mobile broadcast service center 100 includes a communications port 116, a request processor 118, a routing processor 120, a broadcast video channel generator 122, and a channel bundler 124.

The mobile broadcast service center 100 is configured to create channel bundles 108. These bundles facilitate routing of broadcast video channels 110 throughout the mobile wireless network 102. In some embodiments the channel bundles 108 comprise one or more broadcast video channels 110 packed into an additional data frame with its own overhead (or header) separate from the overhead of the individual broadcast video channels 110. In these embodiments, the mobile broadcast service center 100 is configured route a channel bundle by placing routing instructions for a destination in the overhead of the channel bundle 108. Elements of the mobile wireless network 102 are configured to forward the channel bundle 108 using the overhead in the channel bundle 108 to make routing decisions, not the overhead of the individual broadcast channels 110.

However, in other embodiments the channel bundles 108 are largely conceptual. That is, each channel bundle 108 comprises a list in the mobile broadcast service center 100 of broadcast video channels 110 to be routed to a common destination. In these embodiments, the mobile broadcast service center 100 is configured route a channel bundle 108 by placing routing instructions for the same destination in the overhead of each broadcast video channel 110 in a particular channel bundle 108. Elements of the mobile wireless network 102 are configured to forward the channel bundle 108 using the overhead in the individual broadcast channels 110 to make routing decisions.

The communications port 116 provides the capability to connect the mobile broadcast service center 100 to a mobile wireless network such as the mobile wireless network 102 shown in FIG. 2. Typically, the mobile broadcast service center 100 will be co-located in the same building as the gateway node 112 that serves as an access point for the mobile wireless network 102. The mobile broadcast service center 100 may have more than one communications port 116. In instances where the mobile broadcast service center 100 is co-located with the gateway node 112 the communications port 116 may be constructed according to an appropriate short range transmission protocol such as Ethernet, gigabit Ethernet, or ten gigabit Ethernet. A person of skill in the art will appreciate that another short range transmission protocol may be used instead. In instances where the mobile broadcast service center 100 is not co-located in the same building with the gateway node 112 then the communications port 116 will be constructed according to an appropriate intermediate range or long range transmission protocol such as OC-48 or OC-192. A person of skill in the art will appreciate that another long range transmission protocol may be used instead.

The request processor 118 provides a facility to process broadcast video channels requests. The request processor 118 receives a request for a broadcast video channel 110, examines the request, identifies the requested broadcast video channel 110 and designates one of the mobile wireless devices 104 as a target for delivery of the requested broadcast video channel. In some embodiments, the request may originate from the target mobile wireless device 104. The target mobile wireless device 104 can transmit the request to the one of the base stations 109 that is currently serving the target mobile wireless device 104. This base station 109 can forward the request to the mobile wireless network 102. The mobile wireless network may deliver the request to the mobile broadcast service center 100 through the communications port 116. A person of skill in the art will appreciate that the request may reach the request processor 118 via other paths and from other sources. In some embodiments, a user may submit the request via an internet connection to the mobile broadcast service center 100.

A routing processor 120 in the mobile broadcast service center 100 is configured to designate one of the radio network controllers 106 as a target for delivery of a requested broadband broadcast video channel. The routing processor 120 has logic that will designate one of the radio network controllers 106 that is currently serving the target mobile wireless device 104 as the target radio network controller 106.

As previously discussed, the mobile broadcast service center 100 is configured to create channel bundles 108. The routing processor 120 may function to generate the necessary headers to assure proper routing. In the embodiment where one or more broadcast video channels 110 are packed into channel bundles 108, the routing processor 120 may generate the header data for the bundle of multiple broadcast video channels. Alternatively, the routing processor 120 may generate the necessary headers for the individual ones of the broadcast video channels 110 to be routed to a common destination.

The video channel generator 122 of the mobile broadcast service center 100 has facilities to generate broadcast video channels 110. The methods for the mobile broadcast service center 100 to generate video content are not limited. For example, in some embodiments, the video channel generator 122 generates video channels by accessing storage media where video content for the video channel is stored. The storage media may be a component of the mobile broadcast service center 100. Alternatively, the storage media may be external to and connected with the mobile broadcast service center 100. In other embodiments, the video channel generator 122 generates video channels by receiving a signal carrying video content from outside the mobile broadcast service center 100.

The channel bundler 124 of the mobile broadcast service center 100 is configured to pack broadcast video channels 110 into channel bundles 108. The channel bundles 108 may be sent out the communications port 116. The channel bundler 124 has logic to determine if an existing channel bundle 108 is routed to the target radio network controller 106 and determine if it already includes the requested broadcast video channel 110. The channel bundler 124 has logic to add the requested broadcast video channel 100 to an existing channel bundle 108 routed to the target radio network controller 106 if the existing channel bundle 108 does not already include the requested broadcast video channel 108. The channel bundler 124 has logic to route a new channel bundle 108, to the target radio network controller 106 if no broadcast video channel bundle 108 exists that is routed to the target radio network controller 106. The new channel bundle 108 would include the requested broadcast video channel 110.

In the embodiment described above, the mobile broadcast service center 100 designates one of the radio network controllers 106 as the target radio network controller and destination for one or more of the broadcast video channels 110 in a bundle 108. In this embodiment, intermediate nodes, such as the gateway node 112 and the support node 114 effectively act as routers that simply relay the data frames to the appropriate destination (i.e., the target network controller 106). In this embodiment, the gateway node 112 and the support nodes 114 may operate at the network level in an OSI model to transport and route the message (i.e., the broadcast video channels 110) to their proper destination.

However, in an alternative embodiment, the intermediate nodes (i.e., the gateway node 112 of the support nodes 114) may have additional intelligence. In this embodiment, the intermediate nodes have knowledge of the specific broadcast video channels being processed by the nodes.

Figure 4:
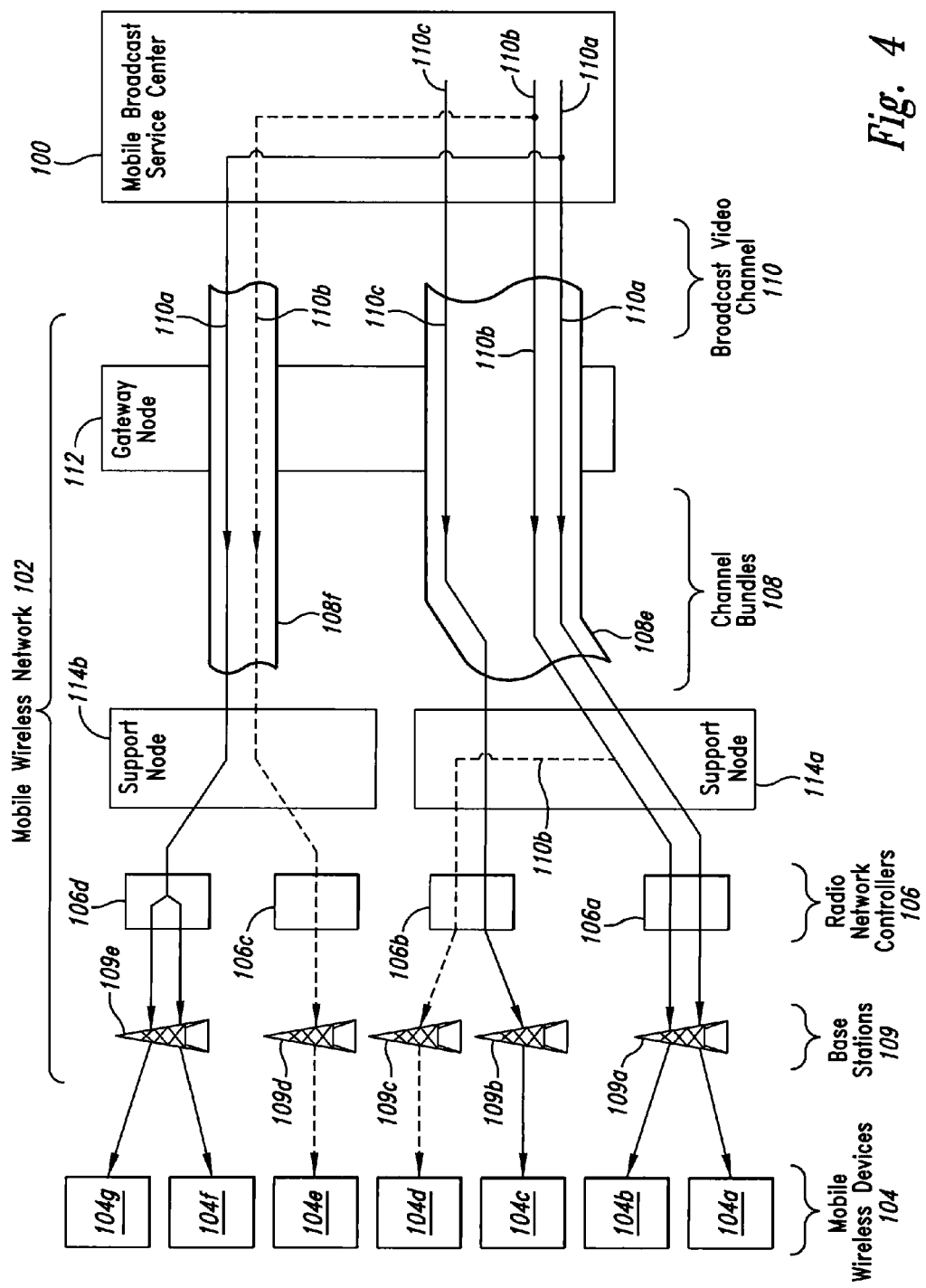
FIG. 4 shows an overall view of the mobile wireless network providing broadcast video to mobile wireless devices in a distributed network architecture.

This distributed network architecture allows for a different delivery paradigm for the broadcast video channels 110. FIG. 4 illustrates this distributed network architecture. In a first example, the video broadcast channel 110$a$ has been requested by the mobile wireless devices 104$f$-104$g$. The requested broadcast video channel (i.e., the broadcast video channel 110$a$) is provided by the mobile broadcast service center 100 to the radio network controller 106$d$ via the gateway node 112 and the support node 114$b$. In addition to providing routing functions, the gateway node 112 and the support node 114$b$ also operate at an application level in the OSI model to detect and monitor the transmissions. That is, the gateway node 112 and the support node 114$b$ are aware that they are relaying the broadcast video channel 110$a$. In this example, the mobile wireless device 104$e$ transmits a request to receive the mobile broadcast channel 110$b$. As previously described, this request is relayed through the mobile wireless network 102. However, at each intermediate node (i.e., the support node 114$b$ and the gateway node 112), the mobile wireless network analyzes the request to determine whether that particular intermediate node is already processing the requested broadcast video channel (i.e., the broadcast video channel 110$b$). In this example, neither the gateway node 112 nor the support node 114$b$ are currently processing the requested broadcast video channel 110$b$. In this event, the request for the broadcast video channel 110$b$ is relayed to the mobile broadcast service center 100. The mobile broadcast service center responds in the manner previously described to add the requested broadcast video channel 110$b$ to the channel bundle 108$f$. In this manner, the requested broadcast video channel 110$b$ is routed to the radio network controller 106$c$. The intermediate nodes (i.e., the gateway node 112 and the support node 114) are configured not only to relay the requested broadcast video channel 100b, but to maintain awareness that this new broadcast video channel is being processed by the intermediate nodes.

In a second example, the channel bundle 108e contains broadcast video channels 110a-110c. The broadcast video channels 110a-110b are routed from the mobile broadcast service center 100 to the radio network controller 106a via the gateway node 112 and the support node 114a. The broadcast video channel 110c is routed from the mobile broadcast service center 100 to the radio network controller 106b via the gateway node 112 and the support node 114a. As described above, the intermediate nodes (i.e., the gateway node 112 and the support node 114a) have application level intelligence that allows it to determine the identity of the broadcast video channels being routed through those intermediate nodes.

In this second example, the mobile wireless device 104d transmits a request for broadcast video channel 110b. The radio network controller 106b relays that request to the support node 114a. In the first embodiment described herein, the support node 114a simply relays the request through the mobile wireless network 102 to the mobile broadcast service center 100. However, in the second embodiment, the support node 114a is configured to operate at an application level and monitors the broadcast video channels being transmitted via the support node 114a. In this example, the mobile wireless device 104d has requested a broadcast video channel (i.e., the broadcast video channel 110b) that is already being processed the support node 114a. In this case, it is unnecessary for the support node 114a to relay the request any farther through the mobile wireless network 102. Instead, the support node 114a is configured to route the requested broadcast video channel 110b to the radio network controller 106b as well as continuing to route the requested broadcast video channel 110b to the radio network controller 106a. In this embodiment, the distributed network architecture only requires that a request for a broadcast video channel be relayed to a point in the mobile wireless network 102 where that requested broadcast video channel already exists.

Figure 5:
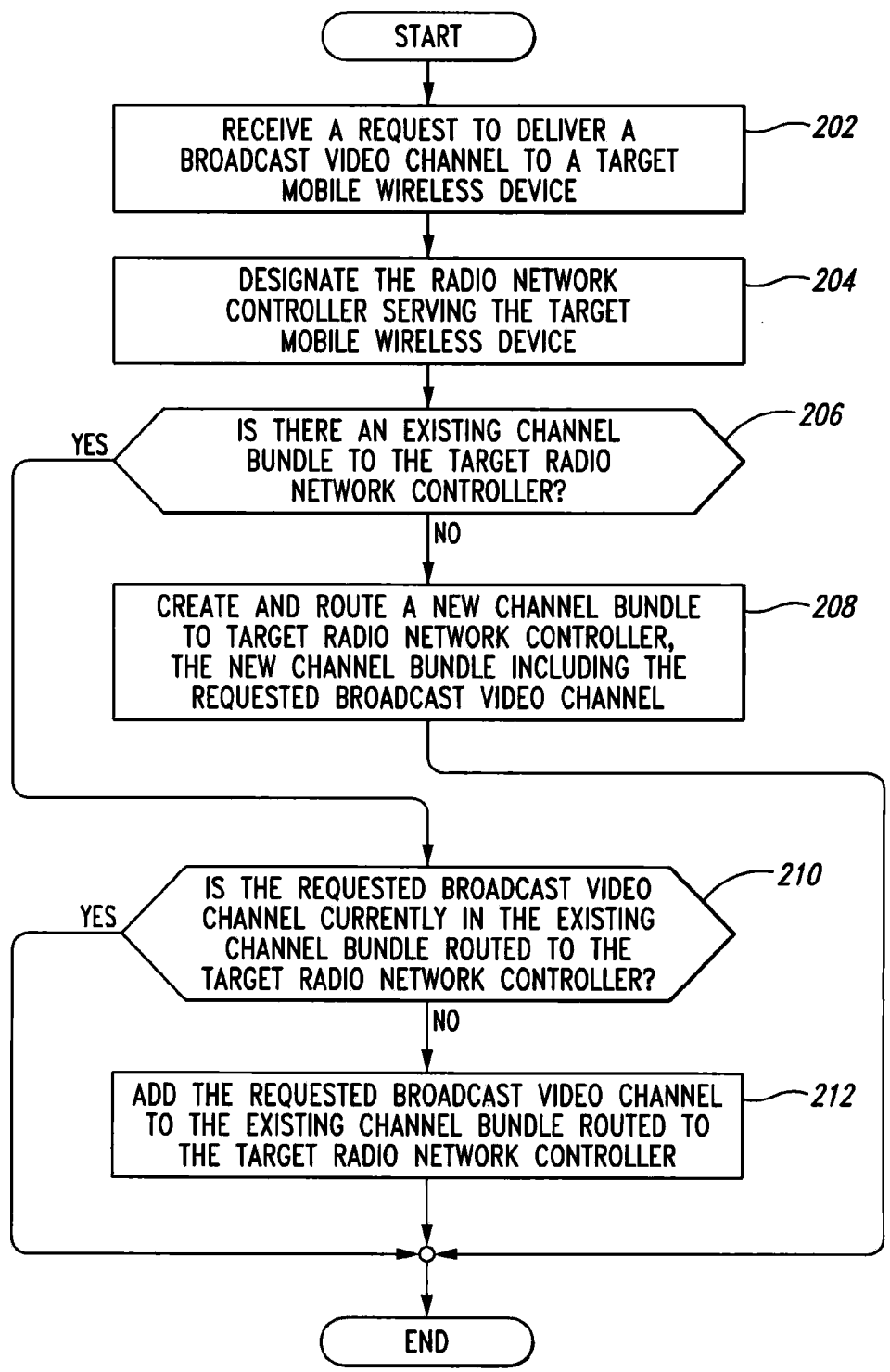
FIG. 5 shows a flow chart of a method for a mobile broadcast service center to provide broadcast video services to users of mobile wireless devices through a mobile wireless network.

FIG. 5 shows a flow chart for a method of a mobile broadcast service center 100 to connect to a mobile wireless network 102 and deliver channel bundles 108 of broadcast video channels 110.

In step 202, the mobile broadcast service center 100 receives a request to deliver a broadcast video channel 110 to a target mobile wireless device 104. In some embodiments, this request is generated by the target mobile wireless device 104 itself and transmitted to the base station 109 that is currently serving the target mobile wireless device 104. The base station 109 then forwards the request over the mobile wireless network 102. In other embodiments, the mobile network mobile broadcast service center 100 receives the request by other means. In one embodiment, a user may submit the request for a broadcast video channel 110 through a website.

For an example of step 202, presume the mobile wireless device 104d of FIG. 2 requests to receive a new broadcast video channel 110b that is not currently generated by the mobile broadcast service center 100. This request is forwarded through the mobile wireless network 102 via the base station 109c serving the requesting mobile wireless device 104d. The base station 109c forwards the request to the radio network controller 106b that controls the base station 109c. The radio network controller 106b forwards the request to the intermediate support node 114a, which forwards the request to the gateway node 112. Finally, the gateway node 112 forwards the request to mobile broadcast service center 100. The mobile broadcast service center 100 examines the request, identifies the requested broadcast video channel as new channel 110d, and designates the mobile wireless device 104d as the target mobile wireless device.

In step 204, the mobile broadcast service center 100 designates a target radio network controller 106 for the requested broadcast video channel 110. The mobile broadcast service center 100 designates as a target one of the radio network controllers 106 identified as serving the target mobile wireless device 104. There are several ways the radio network controller 106 serving the target mobile wireless device 104 can be identified. In one embodiment, the mobile broadcast service center 100 requests the mobile wireless network 102 to identify the radio network controller 106 serving the target mobile wireless device 104. In another embodiment, the identity of the target radio network controller 106 serving the target mobile wireless device 104 may be included in or with the received request for the broadcast video channel 110. Thus, the request itself may include information identifying the target video network controller 106 and/or the target mobile wireless device 104. In yet another alternative embodiment, the mobile broadcast service center 100 and/or the mobile wireless network 102 received periodic update messages from one or more intermediate nodes (e.g., the gateway node 112 and/or the support node 114) serving the target mobile wireless device 104 that identifies itself as such.

For an example of step 204, the previous example from step 202 is continued. The mobile broadcast service center 100 in FIG. 2 queries the mobile wireless network 102 to identify the radio network controller 106b that controls the base station 109c that serves the target mobile wireless device 104d. Upon reply, the mobile broadcast service center 100 designates the identified radio network controller 106b as the target radio network controller. Routing of the requested broadcast video channel (e.g., the broadcast video channel 110c) occurs in the manner described above.

In step 206, the mobile broadcast service center 100 determines if there is an existing channel bundle 108 that is routed to the target radio network controller 106 but does not already include the requested broadcast video channel 110. If there is such a channel bundle 108, then step 208 is skipped in the process continues with step 210. If there is no such existing channel bundle 108 routed to the target radio network controller 106, then step 208 is performed wherein the mobile broadcast service center 100 adds the requested broadcast video channel to that existing channel bundle 108.

For an example of step 206, the previous example from step 204 is continued. The mobile broadcast service center 100 determines that an existing channel bundle 108b is routed to the target radio network controller 106b (i.e., the result of step 206 is YES). In that event, the mobile broadcast service center 100 moves to step 210 to determine whether the requested broadcast video channel 110 is currently in the existing channel bundle 108 routed to the target radio network controller 106.

However, if the mobile broadcast service center 100 determines that there is no existing channel bundle to the target radio network controller, the result of step 206 is NO. This is illustrated in FIG. 2 with the mobile wireless device 104e requesting the broadcast video channel 110b. In this example, the mobile wireless device 104e is coupled to the mobile wireless network 102 via the base station 109d, which is controlled by the radio network controller 106c. Thus, the radio network controller 106c is designated as the target radio network controller. The request for the broadcast video channel 110b is routed from the radio network controller 106c to the mobile broadcast service center 100 via the support node 114b and the gateway node 112. In executing step 206, the mobile broadcast service center 100 would determine that there is no existing channel bundle to the target radio network controller 106*c*. In that event, the mobile broadcast service center executes step 208 to route a new channel bundle (e.g., the channel bundle 108*c*) to the target radio network controller 106*c*. The channel bundle 108*c* contains the requested broadcast video channel 110*b*. The requested broadcast video channel 110*b* is routed to the target radio network controller 106*c* via the gateway node 112 and the support node 114*b*. The target radio network controller 106*c* relays the requested broadcast video channel 110*b* to the base station 109*d* for transmission to the mobile wireless device 104*e*.

In step 210, the mobile broadcast service center 100 determines if the requested broadcast video channel is currently routed to the identified target radio network controller. If there is such a channel, then the result of step 210 is YES, and the method is terminated. If there is not, then step 212 is performed wherein the mobile broadcast service center 100 routes a new channel bundle to the target radio network controller with the new channel bundle including the requested broadcast video channel.

For an example of steps 210 and 212, assume that mobile wireless device 104*e* in FIG. 2 had requested broadcast video channel 110*b*, the mobile broadcast service center 100 had designated mobile wireless device 104*e* as the target mobile wireless device and had designated the radio network controller 106*c* as the target radio network controller. The mobile broadcast service center 100 then determines that there is no broadcast video channel currently routed to the target radio network controller 106*c* (i.e., the result of step 206 is NO and the result of step 210 is NO). The mobile broadcast service center 100 then routes the new channel bundle 108*c* to the target radio network controller 106*c*. This new channel bundle 108*c* includes the requested broadcast video channel 110*b*.

Note, the requested broadcast video channel 110*b* was already packed in channel bundle 108*a* heading to radio network controller 106*a*. However, the mobile broadcast service center 100 would not route another copy of channel bundle 108*a* to the target radio network controller 106*c* because channel bundle 108*a* contains an additional broadcast video channel 110*a* that has not been requested by any mobile device served by the target radio network controller 106*c*.

In another example, consider the channel bundle 108*b*. The mobile wireless device 104*d* requests the video channel 110*b*. The request for the video channel 110*b* is routed to the mobile broadcast service center 100 via the base station 109*c*, the radio network controller 106*b*, the support node 114*a*, and the gateway node 112. At the mobile broadcast service center 100, it is determined that a channel bundle (i.e., the channel bundle 108*b*) already exists with the radio network controller 106*b* as the target radio network controller (i.e., the result of step 206 is YES). In that event, the mobile wireless network 102 need not create a new channel bundle (i.e., step 208 is skipped). In step 210, the mobile broadcast service center 100 determines that the existing channel bundle 108*b* does not contain the requested broadcast video channel 110*b* (i.e., the result of step 210 is NO). In that case, the mobile broadcast service center 110 adds the requested broadcast video channel 110*b* to the existing channel bundle 108*b* routed to the target radio network controller 106*b*.

In the examples described above, the requests for broadcast video channels are routed to the mobile broadcast service center 100 via the mobile wireless network 102. In this embodiment, the intermediate nodes (e.g., the gateway node 112 and the support nodes 114) essentially operate as routers, in the manner described above. However, in the alternative embodiment described above, the intermediate nodes (e.g., the gateway node 112 and the support nodes 114) operate at an application level and have an awareness of the broadcast video channels being routed therethrough. This embodiment, discussed above with respect to FIG. 4, permits routing to and from the intermediate nodes. As described above, a request for a particular broadcast video channel need not be routed all the way back to the mobile broadcast service center 100 if the requested broadcast video channel is available at another node within the network, such as the gateway node 112, the support nodes 114, or the radio network controllers 106.

In one example using the distributed network architecture of FIG. 4, the mobile wireless device 104*d* requests the broadcast video channel 110*b*. This request is forwarded through the mobile wireless network 102 only as far as the support node 114*a*. Because the requested broadcast video channel 110*b* is present within the support node 114*a*, the support node is configured to route the requested broadcast video channel 110*b* through the radio network controller 106*b* to be broadcast by the base station 109*c* to the mobile wireless device 104*d*. Thus, in the embodiment of FIG. 4, the request to deliver a broadcast video channel is relayed only to the point within the mobile wireless network 102 where the requested broadcast video channel is already present.

Those of ordinary skill in the art will appreciate that the flow chart of FIG. 5 can be applied to the network architecture illustrated in FIG. 4. In the event that a mobile wireless device 104 requests a broadcast video channel 110 that is not presently available within the mobile wireless network 102, the system illustrated in FIG. 4 operates in a manner similar to the system illustrated in FIG. 2. For example, consider the mobile wireless device 104*e*, which has requested the broadcast video channel 110*b*. The request for the broadcast video channel 110*b* is relayed from the mobile wireless device 104*e* through the base station 109*d* to the radio network controller 106*c*. Because the requested broadcast video channel 110*b* is not available at the radio network 106*c*, the request is relayed from the radio network controller to the support node 114*b*. Since the requested broadcast video channel 110*b* is not present in the support node 114, the support node relays the request to the gateway node 112, which may relay the request for the broadcast video channel to the mobile broadcast service center 100. Thus, the request for the broadcast video channel 110*b* is relayed through the mobile wireless network 102 to the mobile broadcast service center 100. It should be noted that the requested broadcast video channel in this example (i.e., the broadcast video channel 110*b*) is available in the support node 114*a*. However, since the target mobile wireless device 104*e* is not coupled to the support node 114*a*, the request is relayed to the gateway node 112.

The mobile broadcast service center 100 determines that there is an existing channel bundle (i.e., the channel bundle 108*f*) that exists between the mobile broadcast service center 100 and the support node 114*b*. Thus, the result of step 206 is YES. In that event, the mobile broadcast service center determines that the requested broadcast video channel (i.e., the broadcast video channel 110*b*) is not currently in the existing channel bundle (i.e., the channel bundle 108*f*) routed to the target radio network controller (i.e., the radio network controller 106*c*). Thus, the result of step 210 is NO and, at step 212, the mobile broadcast service center 100 adds the requested broadcast video channel 110*b* to the existing channel bundle 108*f*. Thus, the requested broadcast video channel is relayed from the mobile broadcast service center to the radio network controller 106*c* via the gateway node 112 and the support node 114*b*. The requested broadcast video channel is subsequently relayed to the base station 109*d* for transmission to the mobile wireless device 104*e*.

In an alternative embodiment, it should be noted that the requested broadcast video channel in the above example (i.e., the broadcast video channel 110b) is present within the gateway node 112. Thus, the gateway node 112 may operate at an application level to receive the request for the broadcast video channel 110b and to route the requested broadcast video channel from the gateway node 112 to the support node 114b. Accordingly, in this embodiment, the request for the broadcast video channel 110b need not be relayed from the gateway node 112 to the mobile broadcast service center. That is, the request for the broadcast video channel 110b terminates at the gateway node 112 because the gateway node is already receiving the requested broadcast video channel 110b.

In another example of the operation of the distributed architecture mobile wireless network, consider the request for the broadcast video channel 110b by the mobile wireless device 104d, shown in FIG. 4. The request for the broadcast video channel 110b is received via the radio network controller 106b and relayed to the support node 114a. Because the support node 114a operates at an application level, the support node is aware that it already is receiving the requested broadcast video channel 110b. Thus, the support node 114a may execute portions of the flowchart of FIG. 5 to determine whether the requested broadcast video channel is available for routing to the target radio network controller (i.e., the radio network controller 106b). In this embodiment, the support node 114a routes the requested broadcast video channel 110b to the radio network controller 106b.

A system and method has been described for the creation of broadcast video channels 110 to be routed through a mobile wireless network 102. The system also has the capability of terminating the broadcasts and deleting the broadcast video channels 110 from the mobile wireless network 102. In some cases, the requested broadcast video channel may have a natural termination time. For example, the requested broadcast video channel could be a broadcast of a sporting event, which may have an indeterminate broadcast termination time. When the sporting event has ended, the broadcast video channel may be terminated by the mobile broadcast service center 100. In another example, the requested broadcast video channel may be a conventional broadcast program, which has a determinate length (e.g., one hour). When the program has terminated, the mobile broadcast service center 100 may terminate the requested broadcast video channel 110. In yet another example, the user may request a broadcast video channel for a certain length of time. For example, the user may request a broadcast video channel of music video for some user-determined length of time (e.g., one hour, two hours, twenty-four hours, etc.). Following the completion of the requested time period, the mobile broadcast service center 100 may terminate the broadcast video channel 110. Other conventional techniques may be used to terminate the requested broadcast video channel 110.

The components of described herein may in some embodiments be implemented as a computer processor coupled to a memory, the memory containing instructions that when executed by the computer processor, perform the functions as described above. In other embodiments, the components described herein may be realized as hard-wired circuits.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method, comprising:
receiving, by an intermediate network router comprising a processor, from a source gateway router streamed content associated with a broadcast video channel initiated by a mobile broadcast service center that provides broadcast video services, wherein the intermediate network router is coupled to a plurality of radio network controllers that control a plurality of base stations providing wireless services to each of a plurality of mobile communication devices, and wherein the plurality of base stations comprise a plurality of wireless base stations;
routing, by the intermediate network router, over a first routing path the streamed content associated with the broadcast video channel to a first radio network controller of the plurality of radio network controllers for delivery to a first base station of the plurality of base stations that delivers the streamed content to a first mobile communication device of the plurality of mobile communication devices requesting content over the broadcast video channel and serviced by the first radio network controller;

storing, by the intermediate network router, information indicating that the streamed content associated with the broadcast video channel is being delivered to the first radio network, wherein the information associated with the streamed content is added to a new channel bundle or existing channel bundle, and wherein the intermediate network router deletes or adds channel bundles from storage according to channel bundle changes initiated by the mobile broadcast service center to satisfy user content requests;

receiving, by the intermediate network router, a request from a second radio network controller of the plurality of radio network controllers to deliver the streamed content associated with the broadcast video channel to a second mobile communication device of the plurality of mobile communication devices serviced by a second base station of the plurality of base stations coupled to the second radio network controller;

determining, by the intermediate network router, that the streamed content associated with the broadcast video channel is being delivered to the first radio controller according to the stored information;

determining, by the intermediate network router, that the request does not need to be routed to the source gateway or the mobile broadcast service center; and splitting, by the intermediate network router, the first routing path to create a second routing path for routing the streamed content associated with the broadcast video channel to the second radio network controller for delivery of the streamed content to the second base station for delivery to the second mobile communication device while continuing to route the streamed content associated with the broadcast video channel to the first radio network controller without interruption, wherein routing of the streamed content associated with the broadcast video channel to the second radio network controller is performed without informing the source gateway router or the mobile broadcast service center, and wherein the streamed content routed to the first radio network controller and to the second radio network controller constitutes a simulcast transmission of the streamed content associated with the broadcast video channel for simulcast delivery to the first mobile communication device and the second mobile communication device.

2. The method of claim 1, wherein the intermediate network router is a support node.

3. The method of claim 1, further comprising obtaining an identity of the streamed content.

4. The method of claim 3, wherein storing the information indicating that the streamed content associated with the broadcast video channel is being delivered to the first radio network further comprises storing the identity of the streamed content.

5. The method of claim 3, wherein the stored information comprises the identity of the streamed content.

6. The method of claim 1, wherein the plurality of mobile communication devices comprise a plurality of wireless mobile communication devices.

7. A non-transitory machine-readable storage medium, comprising executable instructions, which when executed by a processor of an intermediate network router, causes the processor to perform operations comprising:

receiving from a source gateway router streamed content associated with a broadcast video channel initiated by a mobile broadcast service center that provides broadcast video services, wherein the intermediate network router is coupled to a plurality of radio network controllers that control a plurality of base stations providing wireless services to each of a plurality of mobile communication devices, and wherein the plurality of base stations comprise a plurality of wireless base stations;

routing over a first routing path the streamed content associated with the broadcast video channel to a first radio network controller of the plurality of radio network controllers for delivery to a first base station of the plurality of base stations that delivers the streamed content to a first mobile communication device of the plurality of mobile communication devices requesting content over the broadcast video channel and serviced by the first radio network controller;

storing information indicating that the streamed content associated with the broadcast video channel is being delivered to the first radio network, wherein the information associated with the streamed content is added to a new channel bundle or existing channel bundle, and wherein the intermediate network router deletes or adds channel bundles from storage according to channel bundle changes initiated by the mobile broadcast service center to satisfy user content requests;

receiving a request from a second radio network controller of the plurality of radio network controllers to deliver the streamed content associated with the broadcast video channel to a second mobile communication device of the plurality of mobile communication devices serviced by a second base station of the plurality of base stations coupled to the second radio network controller;

determining that the streamed content associated with the broadcast video channel is being delivered to the first radio controller according to the stored information;

determining that the request does not need to be routed to the source gateway or the mobile broadcast service center; and splitting the first routing path to create a second routing path for routing the streamed content associated with the broadcast video channel to the second radio network controller for delivery of the streamed content to the second base station for delivery to the second mobile communication device while continuing to route the streamed content associated with the broadcast video channel to the first radio network controller without interruption, wherein routing of the streamed content associated with the broadcast video channel to the second radio network controller is performed without informing the source gateway router or the mobile broadcast service center, and wherein the streamed content routed to the first radio network controller and to the second radio network controller constitutes a simulcast transmission of the streamed content associated with the broadcast video channel for simulcast delivery to the first mobile communication device and the second mobile communication device.

8. The non-transitory machine-readable storage medium of claim 7, wherein the intermediate network router is a support node.

9. The non-transitory machine-readable storage medium of claim 7, wherein the operations further comprise obtaining an identity of the streamed content.

10. The non-transitory machine-readable storage medium of claim 9, wherein storing the information indicating that the streamed content associated with the broadcast video channel is being delivered to the first radio network further comprises storing the identity of the streamed content.

11. The non-transitory machine-readable storage medium of claim 9, wherein the stored information comprises the identity of the streamed content.

12. The non-transitory machine-readable storage medium of claim 7, wherein the plurality of mobile communication devices comprises a plurality of wireless mobile communication devices.

13. An intermediate network router, comprising:
a memory to store executable instructions; and
a processor coupled to the memory, wherein responsive to executing the instructions, the processor performs operations comprising:
receiving from a source gateway router streamed content associated with a broadcast video channel initiated by a mobile broadcast service center that provides broadcast video services, wherein the intermediate network router is coupled to a plurality of radio network controllers that control a plurality of base stations providing wireless services to each of a plurality of mobile communication devices, and wherein the plurality of base stations comprise a plurality of wireless base stations;
routing over a first routing path the streamed content associated with the broadcast video channel to a first radio network controller of the plurality of radio network controllers for delivery to a first base station of the plurality of base stations that delivers the streamed content to a first mobile communication device of the plurality of mobile communication devices requesting content over the broadcast video channel and serviced by the first radio network controller;
storing information indicating that the streamed content associated with the broadcast video channel is being delivered to the first radio network, wherein the information associated with the streamed content is added to a new channel bundle or existing channel bundle, and wherein the intermediate network router deletes or adds channel bundles from storage according to channel bundle changes initiated by the mobile broadcast service center to satisfy user content requests;
receiving a request from a second radio network controller of the plurality of radio network controllers to deliver the streamed content associated with the broadcast video channel to a second mobile communication device of the plurality of mobile communication devices serviced by a second base station of the plurality of base stations coupled to the second radio network controller;
determining that the streamed content associated with the broadcast video channel is being delivered to the first radio controller according to the stored information;
determining that the request does not need to be routed to the source gateway or the mobile broadcast service center; and
splitting the first routing path to create a second routing path for routing the streamed content associated with the broadcast video channel to the second radio network controller for delivery of the streamed content to the second base station for delivery to the second mobile communication device while continuing to route the streamed content associated with the broadcast video channel to the first radio network controller without interruption, wherein routing of the streamed content associated with the broadcast video channel to the second radio network controller is performed without informing the source gateway router or the mobile broadcast service center, and wherein the streamed content routed to the first radio network controller and to the second radio network controller constitutes a simulcast transmission of the streamed content associated with the broadcast video channel for simulcast delivery to the first mobile communication device and the second mobile communication device.

14. The intermediate network router of claim 13, wherein the intermediate network router is a support node.

15. The intermediate network router of claim 13, wherein the operations further comprise obtaining an identity of the streamed content.

16. The intermediate network router of claim 15, wherein storing the information indicating that the streamed content associated with the broadcast video channel is being delivered to the first radio network further comprises storing the identity of the streamed content.

17. The intermediate network router of claim 15, wherein the stored information comprises the identity of the streamed content.

18. The intermediate network router of claim 13, wherein the plurality of mobile communication devices comprise a plurality of wireless mobile communication devices.

* * * * *